United States Patent [19]

Chari et al.

[11] 4,278,905

[45] Jul. 14, 1981

[54] APPARATUS FOR SUPPORTING A STATOR WINDING IN A SUPERCONDUCTIVE GENERATOR

[75] Inventors: Madabushi V. K. Chari, Schenectady; Donald W. Jones, Burnt Hills; Evangelos T. Laskaris, Schenectady, all of N.Y.

[73] Assignee: Electric Power Research Institute, Palo Alto, Calif.

[21] Appl. No.: 12,718

[22] Filed: Feb. 16, 1979

Related U.S. Application Data

[63] Continuation-in-part of Ser. No. 864,540, Dec. 27, 1977, abandoned.

[51] Int. Cl.$^3$ .............................................. H02K 9/00
[52] U.S. Cl. .................................. 310/52; 310/214; 310/258
[58] Field of Search ............... 310/178, 180, 10, 40, 310/52, 184, 214, 215, 209, 216, 218, 254, 258, 259, 213, 86, 208

[56] References Cited

U.S. PATENT DOCUMENTS

| | | | |
|---|---|---|---|
| 2,451,633 | 10/1948 | Perrigo | 310/214 |
| 2,705,292 | 3/1955 | Wagenseil | 310/213 |
| 2,990,487 | 6/1961 | Stigler | 310/214 |
| 3,405,297 | 10/1968 | Madsen | 310/258 |
| 3,560,776 | 2/1971 | Kildishev | 310/214 |
| 3,644,766 | 2/1972 | Hughes | 310/40 R |
| 3,708,707 | 1/1973 | Kranz | 310/258 |
| 3,934,163 | 1/1976 | Mailfert | 310/52 |
| 3,955,271 | 5/1976 | Boesell | 310/214 |
| 4,068,142 | 1/1978 | Gillet | 310/214 |
| 4,137,471 | 1/1979 | Sato | 310/258 |

FOREIGN PATENT DOCUMENTS 963790  7/1964  United Kingdom ..................... 310/213

OTHER PUBLICATIONS

"Fully Slotless Turbogenerators;" Spooner; IEE; vol. 120, No. 12; pp. 1507–1518; 12/1973.

*Primary Examiner*—R. Skudy
*Attorney, Agent, or Firm*—Flehr, Hohbach, Test

[57] ABSTRACT

An apparatus for supporting a stator winding in a superconductive generator. The apparatus includes a plurality of integral stator bars positioned in the air-gap between the yoke and the rotor and a plurality of non-conductive supporting teeth interspaced between the stator bars. The supporting teeth are rigidly attached to the yoke of the generator and are engaged by a plurality of wedge members. The wedge members and the supporting teeth secure the stator bars in a rigid supporting arch.

5 Claims, 5 Drawing Figures

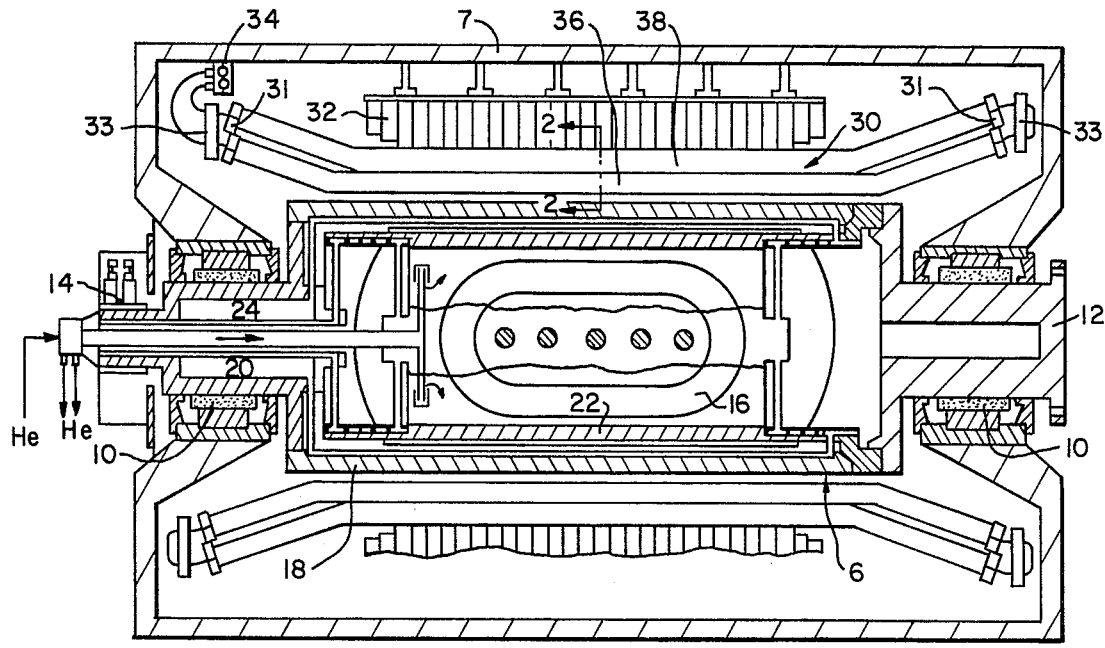
FIG.—1
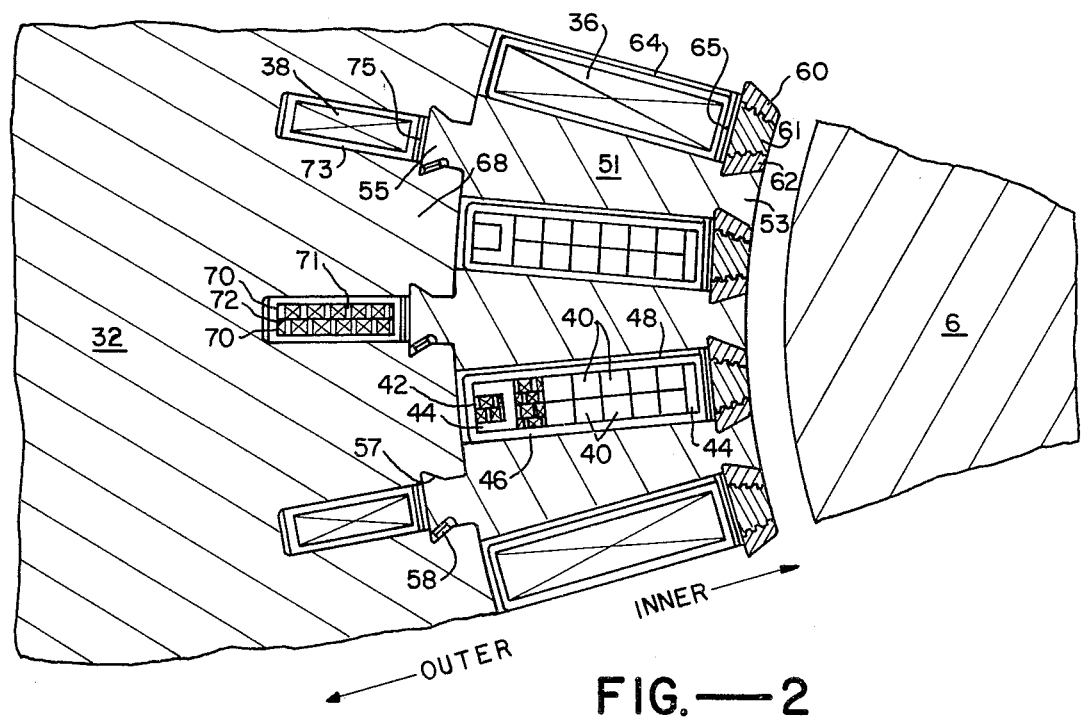
FIG.—2

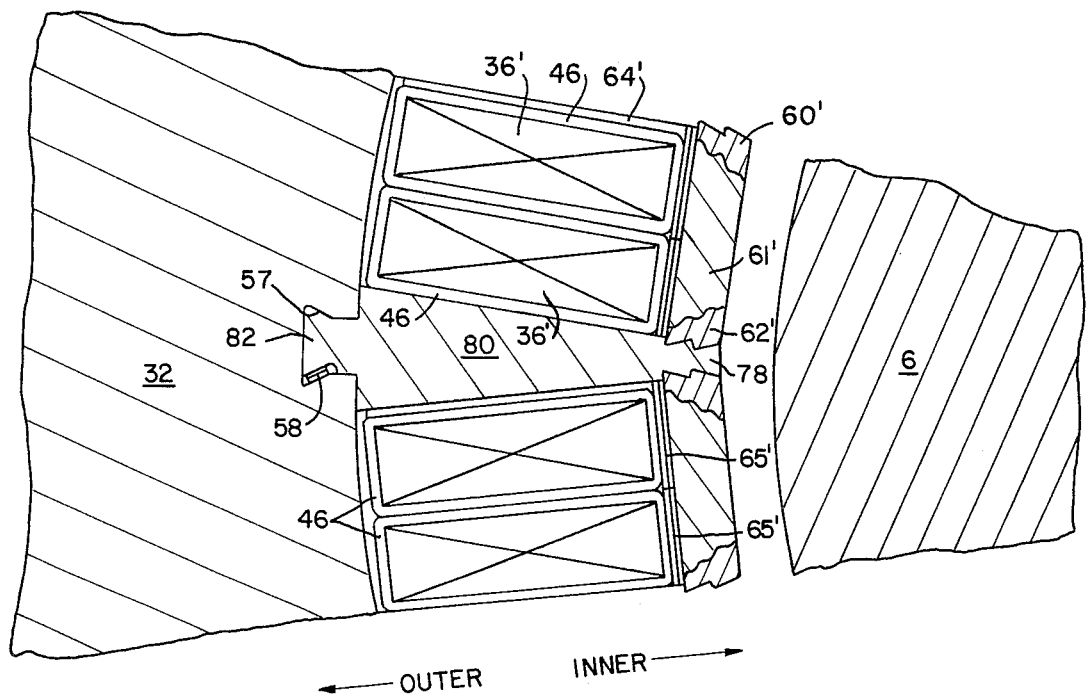
FIG.—3
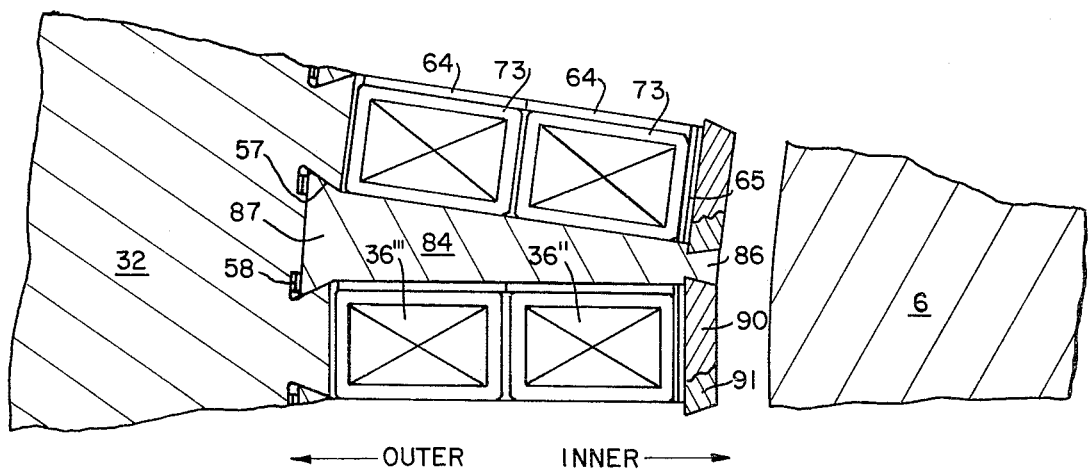
FIG.—4

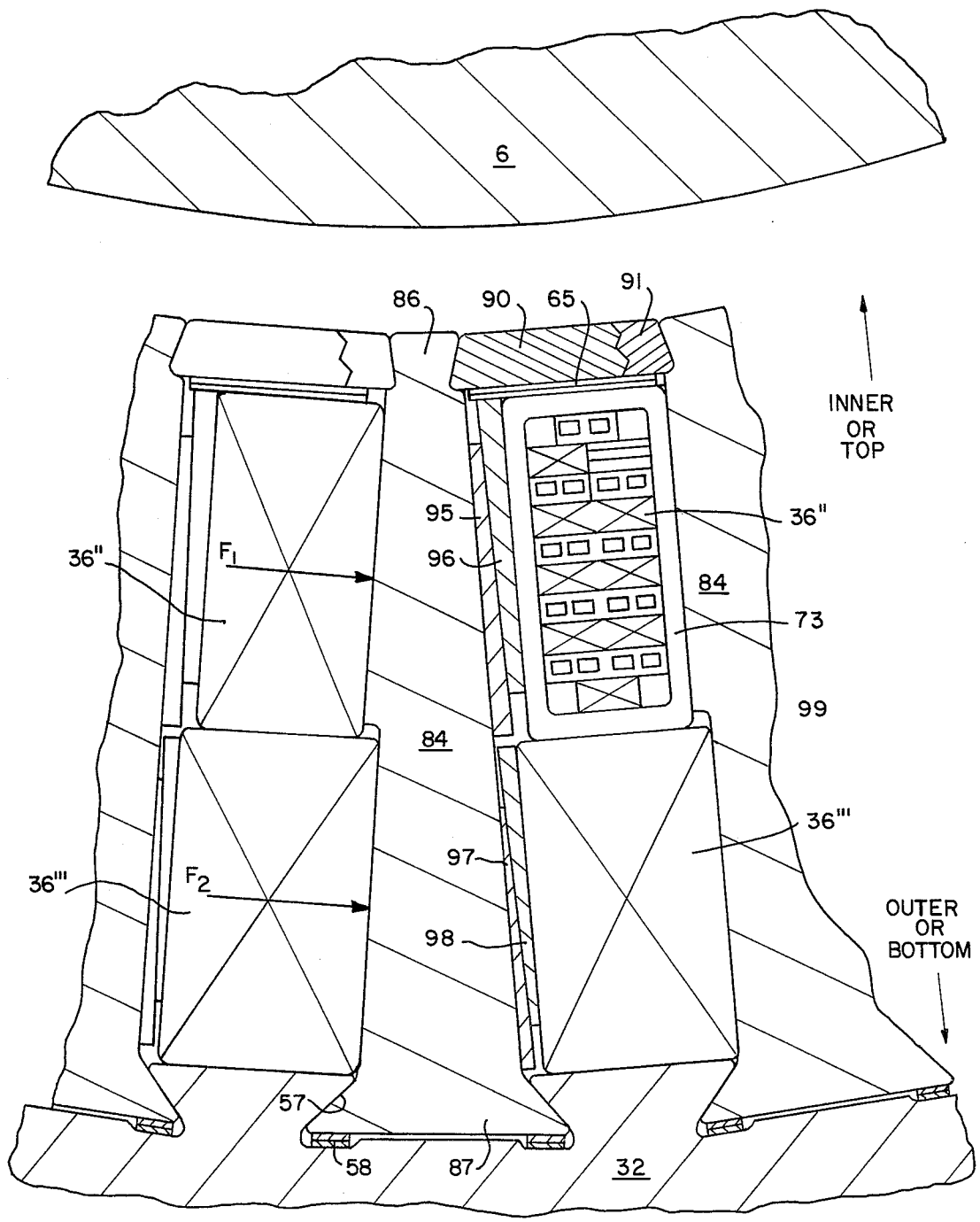
FIG.—5

APPARATUS FOR SUPPORTING A STATOR WINDING IN A SUPERCONDUCTIVE GENERATOR

CROSS REFERENCE TO RELATED APPLICATIONS

This application is a continuation-in-part application of an earlier filed co-pending application entitled APPARATUS FOR SUPPORTING A STATOR WINDING IN A SUPERCONDUCTIVE GENERATOR by Madabushi Venkata Krishnama Chari, Donald Wayne Jones and Evangelos Trifon Laskaris, Ser. No. 864,540, filed Dec. 27, 1977, now abandoned.

BACKGROUND OF THE INVENTION

This invention generally relates to electrical generators and, more particularly, to means for supporting stator windings in superconductive generators.

In a conventional turbine generator the conductors in the stator winding are embedded in slots located in an iron yoke. The slots in the yoke form a plurality of iron teeth that effectively shield the stator windings from the radial magnetic field generated by the rotor. The stator windings are thereby not subjected to torsional forces and are rigidly supported during operation of the generator.

In contrast, in a superconductive electrical generator the stator windings are usually not located in slots in an iron yoke but are located in the air-gap between the yoke and the rotor. The magnetic flux density in a superconductive generator is generally so high that any iron teeth located near the rotor become saturated. When saturation occurs, the iron teeth cause large electrical losses and become very difficult to cool.

Although an air-gap stator winding solves the problem of saturation of the yoke, an air-gap winding is inherently subject to both transverse and radial magnetic fields. These two fields cause both stresses and torques on the windings. Further, air-gap windings are subjected to high flux densities which can cause substantial eddycurrent losses as well as large circulating current losses.

One prior approach to the support of stator windings in the air-gap of a superconductive generator has been to subdivide the individual conductors in the winding into small strands and to wedge the individual strands into place around the inside of the yoke. Integral stator bars are not formed and the conductors are both insulated and cooled with oil.

Another approach has been to wire the stator winding in the machine by hand and then to impregnate all of the conductors together with an epoxy resin. The entire assembly is thereby rigidly secured in place to form a single integral module.

These prior approaches are typically operated at low current levels and without generating much stress on the conductors. In addition, these prior machines do not use a stator bar construction that permits a portion of the stator winding to be removed for repair in the event of failure.

Thus, there has been a continuing need to develop a high-strength stator winding that can be subjected to high levels of stress and torque. Since it is now contemplated that superconductive generators can have an output of 1200 thousand KVA or more, the stators therein must be capable of withstanding the tremendous forces generated during a three-phase short-circuit across the output terminals.

OBJECTS AND SUMMARY OF THE INVENTION

It is an object of the present invention to provide a novel apparatus that overcomes the limitations and disadvantages of the prior art.

A further object of the present invention is to position and support a stator winding in a superconductive generator so that the high magnetic field generated by the superconductive field winding can be optimally utilized. This object is achieved by the single and double layer air-gap winding arrangements described herein which make effective and efficient use of the space between the superconducting rotor and the iron yoke of the generator to achieve high power density levels.

An additional object of the present invention is to develop a winding support system for stator bars located in the air-gap of a superconductive winding that will withstand large torques and radial forces. The present invention effectively restrains the high radial and tangential electromagnetic forces on the stator windings during operation under load and during sudden short-circuits. This object is achieved by an arch bound stator winding support structure composed of many relatively small non-metallic components that are wedged together to act as a single entity to resist the total forces acting on the conductors. This object is also achieved by embedding a part of the stator winding in iron slots in the stator yoke in order to neutralize the tangential forces on that part of the winding and thereby reduce the overall force levels on the entire winding.

Also an object of the present invention is to provide a winding support system that permits removal of the individual stator bars from the generator for either replacement or repair. The support system also facilitates assembly of the stator windings. The support structure described herein is not cast in resin or epoxy material, thereby facilitating assembly during manufacture and disassembly during maintenance and repair.

A further object of the present invention is to provide a non-metallic winding support system that does not cause power loss due to the high magnetic field in the winding region.

These and other objects are achieved by an apparatus for supporting a stator winding in an air-gap of a superconductive electrical generator. The apparatus includes a plurality of integral stator bars positioned in the air-gap between the yoke and the rotor, and a plurality of non-conductive supporting teeth that are interspaced between the stator bars. The supporting teeth are engaged by a plurality of wedge members that secure the stator bars in a rigid supporting arch.

Additional objects and features of the invention will appear from the following description in which the preferred embodiments have been set forth in detail in conjunction with the accompanying drawings.

BRIEF DESCRIPTION OF THE DRAWINGS

FIG. 1 is a diagrammatic, side elevational view of a superconductive electrical generator having a stator winding support apparatus according to the present invention.

FIG. 2 is a side elevational view, in section and broken away, taken along line 2—2 of FIG. 1, illustrating an air-gap stator winding support apparatus according to one embodiment of the present invention.

FIG. 3 is a side elevational view, in section and broken away, of an alternative embodiment of an air-gap stator winding support apparatus according to the present invention.

FIG. 4 is a side elevational view, in section and broken away, of a second alternative embodiment of an air-gap stator winding support apparatus.

FIG. 5 is a side elevational view, in section and broken away, of a third alternative embodiment of an air-gap stator winding support apparatus.

DESCRIPTION OF THE PREFERRED EMBODIMENTS

One type of superconductive generator is illustrated in FIG. 1. The generator includes a rotor 6 that is supported by two bearings 10 in a housing 7. The rotor is turned by a turbine (not shown) attached to the coupling 12. The field winding in the rotor is energized through the collector rings 14. The rotor includes an electromagnetic shield 18 that screens the field winding from negative sequence and other non-synchronous magnetic fields.

The rotor 6, FIG. 1, contains a superconducting field winding 16 which is cooled to liquid helium operating temperatures. Saturated liquid helium is delivered to a central supply tube 20 from a liquefier or supply dewar (not shown). Liquid helium flows along the axis of rotation of the rotor into the torque tube 22. In steadystate operation the liquid helium boils as a result of the heat transferred into the cold region of the rotor. The stream of boil-off vapor flows out of the generator through a concentric exhaust tube 24 and is returned to the liquefier (not shown).

The rotor 6, FIG. 1, turns within a stator winding that includes a plurality of integral stator bars 30. The stator bars are rigidly connected to and are supported by a yoke 32. The yoke is of conventional laminated magnetic iron construction. The yoke is resiliently mounted to the housing 7 so that vibration from the generator is not transferred to the housing. The stator bars 30 are connected at either end by clips 31 which short the individual conductors of the bars together. The stator bars are connected either in series or in parallel, depending upon the design requirements. The stator bars are cooled with de-ionized water which is circulated through the bars by the coolant piping 33 from the cooling manifold 34.

FIG. 2 illustrates a portion of a two-layer stator winding having a plurality of integral stator bars 36 located between the yoke 32 and the rotor 6 and a plurality of integral stator bars 38 positioned within the iron yoke of the generator. This embodiment is a combined air-gap and iron-slot stator design. Both layers of bars are adapted for generating in combination the electrical output current for the generator.

The stator bars 36, FIG. 2, are located in the air-gap between the rotor and the yoke and are not surrounded by iron teeth 68. Because these bars are closest to the rotor 6, they are subjected to the highest magnetic fields. Each stator bar is comprised of a plurality of individual wires. Each wire is individually insulated and has a small diameter, such as 40-50 mils, in order to control eddy-current losses. Each stator bar also includes a plurality of coolant channels 42 which are connected to the coolant piping 33, FIG. 1. The coolant channels are rectangular in cross-section and are fabricated from a resistive material so that eddy-current losses are reduced. The individual wires and rectangular coolant channels are combined into a two-layer flattened strand using conventional stranding equipment. Each flattened strand consists of several individual wires that are twisted together according to conventional Roebel construction. The flattened strands are combined into a sub-bar 40, FIG. 2. Each sub-bar includes several flattened strands that are transposed in accordance with conventional Roebel construction. A group of sub-bars are combined together to form the stator bar 36. The individual wires are twisted into strands so that the conductors are transposed with respect to each other within each strand, and the sub-bars are transposed with respect to each other in the bar so that each stator bar 36 is fully transposed both radially and tangentially with respect to the rotor 6. Full transposition of each stator bar in the air-gap is necessary in order to control circulating current losses.

The sub-bars 40, FIG. 2, are also packed with a filler material 44 to maintain the spacing of the sub-bars within the stator bars. The filler material can be either alumina granules or glass beads or other suitable material. The sub-bars and the filler material are impregnated with a suitable resin to form a solid, integral rectangular member. Each member is thereafter covered with ground wall insulation 46. This insulation consists of a plurality of layers of mica-flakes and glass cloth that is impregnated with a suitable resin. The ground wall insulation protects the sub-bars, which are at a high potential, from shorting to ground. The outside of the ground wall insulation 46 is covered with a layer of grading material such as graphite which forms a high-resistance, conductive coating 48. The conductive coating establishes a ground reference around the outside of the ground wall insulation to eliminate floating potentials in the generator and to remove any high-field gradients from the iron teeth 68.

Referring to FIG. 1, each stator bar 36 located in the air-gap between the yoke 32 and the rotor 6 has an elongate central portion which is parallel to the axis of rotation of the rotor 6. This central parallel portion is called the active length of the stator bars. The end portions of each stator bar are helically curved into the clips 31 according to known construction.

The stator bars 36, FIG. 2, are supported in the air-gap between the yoke 32 and the rotor 6 by a plurality of non-conductive, glass-reinforced-fiber, supporting teeth 51. The teeth are interspaced between the stator bars 36 and are rigidly attached to the yoke 32 of the generator. Each tooth has side walls, a mortise end 53, and a tenon end 55. The tenon end is received in a slot 57 in the yoke and is anchored in place by a plurality of tapered wedges 58. The tenon end 55 and the slot 57 form a dovetail joint. Because the teeth are exposed to the very high magnetic field generated by the superconductive field winding in the rotor 6, the teeth are fabricated from both a non-magnetic and a non-metallic material. In the preferred embodiment each tooth is fabricated from glass fiber and epoxy resin which forms a high-strength, machineable molding. Each tooth has an axial length of approximately twelve inches and the teeth are butted end-to-end along the active length of the stator bars 36. In operation the teeth absorb all of the torque as well as the tangential stresses exerted on the stator bars 36. The magnetic field incident on these bars produces both radial and tangential forces on the bars.

The inner facing surfaces of the mortise ends 53, FIG. 2, are engaged by three wedges 60, 61 and 62. The three wedges slidably engage each other and two of the teeth to form a dovetail joint. The interfaces between the wedges 60, 61, and 61, 62 are serrated so that radial motion of the wedges is prevented. The wedges are axially tapered and are driven into the air-gap axially. That is to say, the wedges are driven in a direction orthogonal to the plane of FIG. 2. When the wedges are driven into place, they pre-load the teeth 51 in compression by forcing the mortise end 53 of each tooth outward. This pre-loading of all of the teeth forms a circular supporting arch around the rotor 6. The wedges lock the stator bars 36 together into a single circumerential unit. The wedges also prevent the tenon ends 55 of the teeth from being bent in the slots 57 like cantilevers when a torque is applied to the stator bars 36.

Radial movement of each stator bar 36, FIG. 2, is prevented by a plurality of tapered wedges 65 that are driven between the wedges 60, 61, 62 and the ground wall insulation 46. Circumferential motion of the stator bar 36 is prevented by rigid filler material 64 located in the gap between the ground wall insulation 46 and the tooth 61. This rigid material keeps the stator bar in place during operation so that the bar does not vibrate in response to tangential forces.

The outer layer of the stator winding, FIG. 2, comprises a second plurality of integral stator bars 38. These stator bars 38 are positioned in the yoke 32 in elongate slots that extend for the length of the yoke in a direction parallel to the axis of rotation of the rotor 6, i.e. axially. These slots form a plurality of iron teeth 68 in the inner surface of the yoke. The iron teeth support the outer stator bars 38 against tangential forces and circumferential movement and also shield the bars so that each bar only sees the cross-slot magnetic flux.

Because of the displacement away from the rotor the outer stator bars 38 are subjected to a less intense magnetic field. The smaller field permits the use of iron teeth for shielding. The outer stator bars are of conventional, singly transposed design. Each bar includes two tiers 70, located side by side, of conventional thin, flat strands of solid conductor. The flat strands are interspersed with cooling ducts 71 and are Roebel transposed. The two tiers are separated by a thin glass cloth 72. The two tiers 70 are wrapped in ground wall insulation 73 comprising alternating layers of mica-flakes and glass cloth and impregnated with a suitable resin. The outer stator bars 38 are singly transposed because each bar is shielded by the iron teeth 68 and only experiences the cross-slot flux. Each outer bar is secured in the yoke by the tenon end 55 of each tooth 51. A plurality of tapered wedges 75 prevent radial motion of the outer bars with respect to the teeth.

It should be noted in FIG. 2 that the outer stator bars 38 are circumferentially displaced with respect to the inner stator bars 36 located in the air-gap. This positioning causes the generation of voltages which are slightly out of phase. Each of the outer stator bars 38 are located on a common radius with one of the teeth 51. Thus, any outwardly directed radial force on the stator bars, such as a terminal fault, is directly resisted by the yoke 32.

The inner stator bars 36 and the outer stator bars 38, FIG. 2, both carry the same amount of current and can be connected either in series or in parallel. It should be noted, however, that the inner bars 36 generate a substantially different voltage from the outer bars and, hence, must be connected in a manner to avoid the formation of circulating currents.

It should also be noted in FIG. 2 that the inner bars 36 have a very large cross-sectional area. These bars have both a large radial dimension and a large circumferential dimension. This dimensioning is necessary because the inner bars are nearer the rotor where the magnetic field is higher and a larger cross-section is necessary in order to carry the same amount of current as the outer bars 38. The outer bars have both smaller radial and circumferential dimensions in order to avoid local high flux regions.

The embodiment of FIG. 2 has several principal advantages. The outer bars 38 embedded in the iron yoke 32 are completely shielded from the electromagnetic forces and the torques produced by the radial magnetic field. These bars are subjected only to radial stresses resulting from the cross-slot leakage fluxes, which are relatively low. However, the inner bars 36 are subjected to stresses and torques resulting from both the tangential and radial components of the magnetic field, but the individual bar forces are significantly reduced compared to a two-layer air-gap winding. In other words, by embedding part of the stator winding in the iron slots in the yoke and thereby neutralizing the tangential forces on that part of the stator, the overall force level on the entire stator winding is reduced. In addition, the inner bars 36 in the air-gap can be constructed with large size conductors, thereby maximizing the amount of copper near the rotor. The outer bars 38 are constructed with smaller sized conductors to ensure acceptable magnetic field levels in the iron slots.

FIG. 3 illustrates an alternative embodiment of the apparatus for supporting a stator winding in a superconductive generator. The stator winding is a single layer large conductor arrangement formed by a plurality of integral stator bars that are positioned in the air-gap between the yoke 32 and the rotor 6. The stator bars 36, 36' are fully transposed and are fabricated in the same manner as the inner stator bars 36 described above in connection with FIG. 2. This construction is used because all of the bars are subjected to radial and tangential components of the magnetic field and the resultant forces and losses. The embodiment of FIG. 3 is a single-layer stator winding wherein the stator bars 36, 36' are grouped in sets in order to obtain as wide a mortise end 78 as possible while maximizing the number of stator bars in the air-gap. If all of the stator bars 36, FIG. 3 were equally spaced apart around the circumference of the rotor 6, the mortise end of each tooth would be too narrow to securely fasten the stator bars in position during operation. The stator bars are grouped in sets comprising at least two circumferentially adjacent bars. Each stator bar 36 is electrically isolated from adjacent stator bars by ground wall insulation 46. The ground wall insulation is constructed in the same manner as described above.

The sets of stator bars 36, FIG. 3, are supported in the air-gap between the yoke 32 and the rotor 6 by a plurality of non-conductive supporting teeth 80. The teeth are interspaced between the sets of stator bars and are rigidly attached to the yoke 32 of the generator. Each tooth has side walls, a mortise end 78 and a tenon end 82. The tenon end is received in a slot 57 in the yoke and is anchored in place by a plurality of tapered wedges 58. The tenon end 82 and the slot 57 form a dovetail joint. The teeth 80 are fabricated from glass fiber and a suitable resin. Each tooth is segmented into axial lengths convenient for assembly and the teeth are butted end-to-end along the active length of the stator bars 36, 36'. The teeth absorb all of the torque as well as the stresses exerted on the stator bars.

In FIG. 3 it should be noted that each side of the mortise end 78 of each tooth forms two dovetail slots in contrast to the single slot formed by the tooth 51, FIG. 2. Two dovetail slots are formed in the embodiment of FIG. 3 in order to maximize the width of the mortise end of the tooth. If only a single dovetail joint were formed, the mortise end of the tooth would be severely undercut and could be severed during tangential loading of the tooth.

The inner facing surfaces of the mortise end 78, FIG. 3, are engaged by three wedges 60',61', and 62'. The three wedges slidably engage each other and two of the teeth to form a dovetail joint. The wedges are axially tapered and are driven into the air-gap axially. When the wedges are driven into place, they pre-load the teeth 80 in compression forcing the mortise end 78 of each tooth outward. This pre-loading of all of the teeth forms a circular supporting arch around the rotor 6. The wedges lock the stator bars 36 together into a single circumferential unit.

Radial movement of each stator bar 36, 36', FIG. 3, is prevented by a plurality of tapered wedges 65, 65' that are driven between the wedges 60', 61', and 62' and the ground wall insulation 46. Circumferential motion of the set of stator bars is prevented by rigid filler material 64' located in the gap between the ground wall insulation 46 and the tooth 80.

The stator bars 36, 36', FIG. 3, in each set are connected in either series or parallel depending on the requirements of the installation. In all respects the active length of each stator bar in each circumferentially-grouped set is electrically independent. The grouping of stator bars into sets is primarily the purpose of mutual mechanical support.

FIG. 4 illustrates a second alternative embodiment of an apparatus for supporting a stator winding in a superconductive generator. The stator winding is a single-circuit, two-layer arrangement and includes a plurality of integral stator bars 36'', 36''' positioned in the air-gap between the yoke 32 and the rotor 6 of a superconductive generator. The bars are grouped in sets, and each set comprises at least two adjacent stator bars located on a common radial line. The two layer arrangement permits the use of smaller size bars, one located over the other, for ease of manufacture, support, and maintenance. The stator bars 36'', 36''' are fully transposed and are constructed in the same manner as the stator bars 36 described in connection with FIG. 2. Each stator bar is electrically isolated from adjacent stator bars by ground wall insulation 73. The ground wall insulation is constructed in the same manner as described above.

The sets of stator bars 36'', 36''', FIG. 4, are supported in the air-gap between the yoke 32 and the rotor 6 by a plurality of non-conductive supporting teeth 84. The teeth are interspaced between the stator bars and are rigidly attached to the yoke 32 of the generator. Each tooth has a mortise end 86 and a tenon end 87. The tenon end is received in a slot 57 in the yoke and is anchored in place by a plurality of tapered wedges 58. The tenon end 87 and the slot 57 form a dovetail joint. The teeth 84 are fabricated from glass fiber and a suitable resin. The teeth absorb all of the torque as well as the stresses exerted on the stator bars.

The inner facing surfaces of the mortise ends 86, FIG. 4, are engaged by two wedges 90, 91. The wedges slidably engage each other and two of the teeth to form a dovetail joint. The wedges are axially tapered and are driven into the air-gap axially. When the wedges are driven into place, they pre-load the teeth 84 in compression by forcing the mortise end 86 of each tooth outward. This pre-loading of all of the teeth forms a circular supporting arch around the rotor 6. The wedges lock the stator bars together into a single ring.

Radial movement of each stator bar 36'', 36''', FIG. 4, is prevented by a plurality of tapered wedges 65 that are driven between the wedges 90, 91 and the ground wall insulation 73. Circumferential motion of the stator bars is prevented by rigid filler material 64 located in the gap between the ground wall insulation 73 and the tooth 84.

The stator bars 36'', 36''', FIG. 4 in each set are connected either in series or parallel depending on the requirements of the installation. The active length of each stator bar in each set is electrically independent.

FIG. 5 illustrates a third alternative embodiment of an apparatus for supporting a stator winding in a superconductive generator. The stator winding is a single-circuit or multiple circuit, two-layer arrangement and includes a plurality of integral stator bars 36'', 36''' positioned in the air gap between the yoke 32 and the rotor 6. The bars are grouped in sets, and each set comprises at least two adjacent stator bars located on a common radial line. Except for the components and processes described below the stator windings and supporting teeth of FIG. 5 are constructed and operate in the same manner as the embodiment of FIG. 4 described above.

In FIG. 5 the inner stator bar 36'' is located nearer the rotor 6 and hence is subjected to a higher field than the outer bar 36'''. To compensate for this positioning, the inner bar 36'' has a smaller circumferential dimension as shown in FIG. 5 and is constructed with thinner strands. The outer bar 36''' has a larger circumferential dimension and uses larger diameter strands. In both cases, however, the strands are kept to a sufficiently small diameter in order to minimize the generation of circulating currents. The difference in circumferential dimension between the top and bottom bars is accomodated by the ledge 99 in the left hand side of each supporting tooth 84.

In one embodiment of FIG. 5 the inner bar 36'' is rigidly secured in the slot formed between the supporting teeth 84 and two lateral wedges 95, 96. In like manner the bottom bar 36''' is rigidly secured in the slot by two lateral wedges 97, 98. These lateral wedges are fabricated from the same non-conductive material as the supporting teeth and are inserted in the conventional manner with a mallet. The two sets of wedges 95-98 compress the side walls of the supporting teeth 84 and thereby lock all of the stator bars into a solid, arch bound structure.

The purpose of the lateral wedges 95-98, FIG. 5 is to prevent bending of the supporting teeth 84 with respect to the yoke when the stator bars 36'', 36''' are subjected to tangential loading. Tangential loading of the stator bars is a result of the electromagnetic field in the generator. It is believed that peak tangential loading on the bars occurs during a 3-phase terminal short circuit. In FIG. 5 the tangential loading on the top bar is represented by the arrow $F_1$ and on the bottom bar by the arrow $F_2$. The lateral wedges lock the bars and the supporting teeth into an integral, rigid structure so that the tangential forces $F_1$, $F_2$ do not bend the supporting teeth 84. The arch bound structure described herein is such that the supporting teeth are only subject to a shear force which is developed across the narrowest portion of the dovetail slots 57.

In operation, when a tangential force is applied to the stator bars 36", 36''', FIG. 5, the force is transmitted to the supporting structure as if the structure were one integral, rigid member. The supporting teeth 84 are not bent about the dovetails 57 in the yoke 32 and only shear stresses are developed.

It should be appreciated that the lateral wedges 95-98, FIG. 5 can be used in the embodiments disclosed in FIGS. 2-4. These lateral wedges are inserted between the supporting teeth 51, 80, and 84 and the stator bars 36-36''', replacing the rigid filler material 64. In these embodiments an arch bound structure is formed by the wedges which engage the mortise end 53, 78, 86 of the supporting teeth and by the lateral wedges 95-98, FIG. 5 that engage the side walls of the teeth.

The embodiments of FIGS. 2-4 have been incorporated into the design of a 300-MVA generator. The table below lists the details of these designs.

The non-metallic supporting teeth described herein can be made from epoxy-glass, fiber-reinforced composite, such as the material identified by NEMA LI1, Grade FR-4; ASTM 0709, Grade FR-4; and MIL-P-18177, Type GEE, which is available from the General Electric Company.

It should be appreciated that the arch bound support structure described herein substantially eliminates any bending of the supporting teeth located in the air gap between the yoke and the rotor. This bending moment arises due to the tangential forces that are developed by the electromagnetic field on the stator bars in the air gap. The arch bound structure is formed by either the lateral wedges 95-98, FIG. 5 engaging the supporting teeth and the stator bars or the end wedges 60-62, 60'-62' and 90, 91 engaging the supporting teeth or both in combination.

It should also be noted that in each embodiment the bars and supporting teeth are inserted member by member. This installation procedure is more flexible than casting the entire stator structure as a single unit. Further, the construction described herein permits the removal of individual bars in case of failure.

Since the supporting teeth are subjected primarily to shear stresses and not a bending moment, the tenon end 87, FIG. 5 of the supporting teeth can be narrowed in size. This permits the insertion of larger stator bars and more copper conductors in the stator to further utilize the high field from the superconductive rotor.

Thus, although the best mode contemplated for carrying out the present invention has been herein shown and described, it will be apparent that modification and variation may be made without departing from what is regarded as the subject matter of the invention.

What is claimed is:

1. An apparatus for supporting a stator winding in a superconductive generator, said generator having a yoke and a rotor comprising:
    (a) a plurality of integral stator bars positioned between the yoke and the rotor in a superconductive generator;
    (b) a plurality of integral stator bars positioned within the yoke of the superconductive generator, said bars being for generating an electrical output current in combination with the stator bars located between the yoke and the rotor;
    (c) a plurality of non-conductive supporting teeth interspaced between the stator bars located between the yoke and the rotor, said teeth being rigidly attached to the yoke of the generator; and
    (d) a plurality of wedge members for engaging the supporting teeth and for rigidly securing the stator bars located between the yoke and the rotor during operation of the generator.

2. An apparatus as in claim 1 in which the stator bars located between the yoke and the rotor are circumferentially displaced with respect to the stator bars in the yoke.

3. An apparatus as in claim 1 in which the supporting teeth lock in the yoke the stator bars located in the yoke and in which the wedge members engge the teeth and pre-load the teeth in compression so that a supporting arch is formed around the rotor.

STATOR WINDING DETAILS
(All dimensions are in inches unless otherwise stated.)

| ITEM | Combined Air-gap Iron-slot Arrangement (FIG. 2) | Single-layer Air-gap Arrangement (FIG. 3) | Double-layer Air-gap Arrangement (FIG. 4) |
|---|---|---|---|
| Number of Parallel Circuits | 1 | 1 | 1 |
| Number of Layers in Winding | 2 | 1 | 2 |
| Wye or Delta Connection | Wye | Wye | Wye |
| RMS Current | 10,200 A(rms) | 15,062 A(rms) | 8,660 A(rms) |
| Stator Line-to-line Voltage | 17 kV | 11.5 kV | 20 kV |
| Bare Bar Width (top bar) | 1.188 | 1.598 | 1.134 |
| Bare Bar Width (bottom Bar) | 0.664 | — | 1.416 |
| Bare Bar Height (top) | 5.516 | 5.476 | 2.64 |
| Bare Bar Height (bottom) | 2.858 | — | 2.64 |
| Number of Solid Strands in Bottom Bar | 40 | — | — |
| Number of Hollow Strands in Bottom Bar | 10 | — | — |
| Number of Sub-bars in Top Bar or Straight Air-gap Winding Conductor | 13 | 11 | 9 |
| Number of Stator Bars | 72 | 48 | 84 |
| Ground Insulation Thickness | 0.369 | 0.242 | 0.384 |
| Bar Width (top) | 1.557 | 1.839 | 1.52 |
| Bar Width (bottom) | 1.067 | — | 1.8 |
| Bar Height (top) | 5.885 | 5.718 | 3.026 |
| Bar Height (bottom) | 3.227 | — | 3.026 |
| Iron Slot Depth | 4.5 | — | — |
| Yoke Depth | 18.875 | 19.5 | 19.5 |

4. An apparatus as in claim 1 wherein the supporting teeth have side walls, a mortise end located near the rotor and a tenon end which engages the yoke and wherein a plurality of said wedge members engages the side walls of the supporting teeth and the stator bars located between the yoke and the rotor so that a rigid supporting arch for the stator bars is formed around the rotor and any bending of the teeth with respect to the yoke is substantially eliminated.

5. An apparatus as in claim 1 in which each stator bar is electrically isolated by a ground wall insulator.

* * * * *